United States Patent
Kai et al.

(10) Patent No.: US 11,719,312 B2
(45) Date of Patent: Aug. 8, 2023

(54) DRIVING FORCE TRANSMITTING APPARATUS, SHEET CONVEYANCE APPARATUS, AND IMAGE FORMING APPARATUS

(71) Applicant: CANON KABUSHIKI KAISHA, Tokyo (JP)

(72) Inventors: Yusuke Kai, Kanagawa (JP); Masaaki Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 17/382,925

(22) Filed: Jul. 22, 2021

(65) Prior Publication Data
US 2022/0034384 A1 Feb. 3, 2022

(30) Foreign Application Priority Data
Jul. 30, 2020 (JP) ................................ 2020-129318

(51) Int. Cl.
*F16H 3/44* (2006.01)
*B65H 5/06* (2006.01)

(52) U.S. Cl.
CPC ............... *F16H 3/44* (2013.01); *B65H 5/062* (2013.01); *B65H 2403/481* (2013.01); *B65H 2403/92* (2013.01); *B65H 2404/166* (2013.01); *B65H 2801/06* (2013.01); *F16H 2003/442* (2013.01); *F16H 2312/09* (2013.01)

(58) Field of Classification Search
CPC ............ F16H 3/44; B65H 5/062; B65H 85/00
See application file for complete search history.

(56) References Cited

U.S. PATENT DOCUMENTS

| | | | |
|---|---|---|---|
| 8,646,776 B2* | 2/2014 | Agata | B65H 5/34 271/902 |
| 9,013,768 B2* | 4/2015 | Ino | H04N 1/0058 358/496 |
| 9,284,138 B2* | 3/2016 | Hino | B65H 3/0669 |
| 9,857,749 B2* | 1/2018 | Ochi | B65H 5/06 |

FOREIGN PATENT DOCUMENTS

JP 2015215090 A 12/2015

* cited by examiner

*Primary Examiner* — Derek D Knight
(74) *Attorney, Agent, or Firm* — Canon U.S.A., Inc. I.P. Division

(57) ABSTRACT

A driving force transmitting apparatus includes first and second planetary gear units and switching and urging members. The first planetary gear unit includes a first mesh gear and a first locked gear provided with first locked portions. The second planetary gear unit includes a second locked gear provided with second locked portions, and a second mesh gear meshing with the first mesh gear. The switching member includes first and second locking portions and can move to (i) a first stop position at which the first locking portion stop the first locked gear, and, urged by the urging member, (ii) a second stop position at which the second locking portion stops the second locked gear. An interval between the second locked portions in a rotational direction of the second locked gear is larger than an interval between the first locked portions in a rotational direction of the first locked gear.

20 Claims, 11 Drawing Sheets

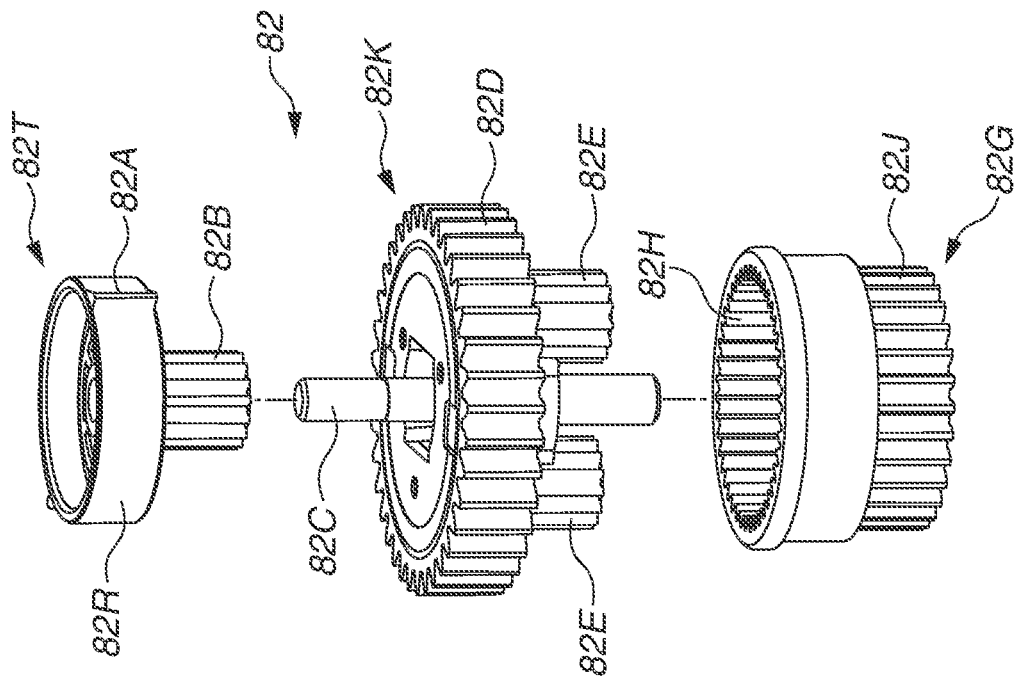
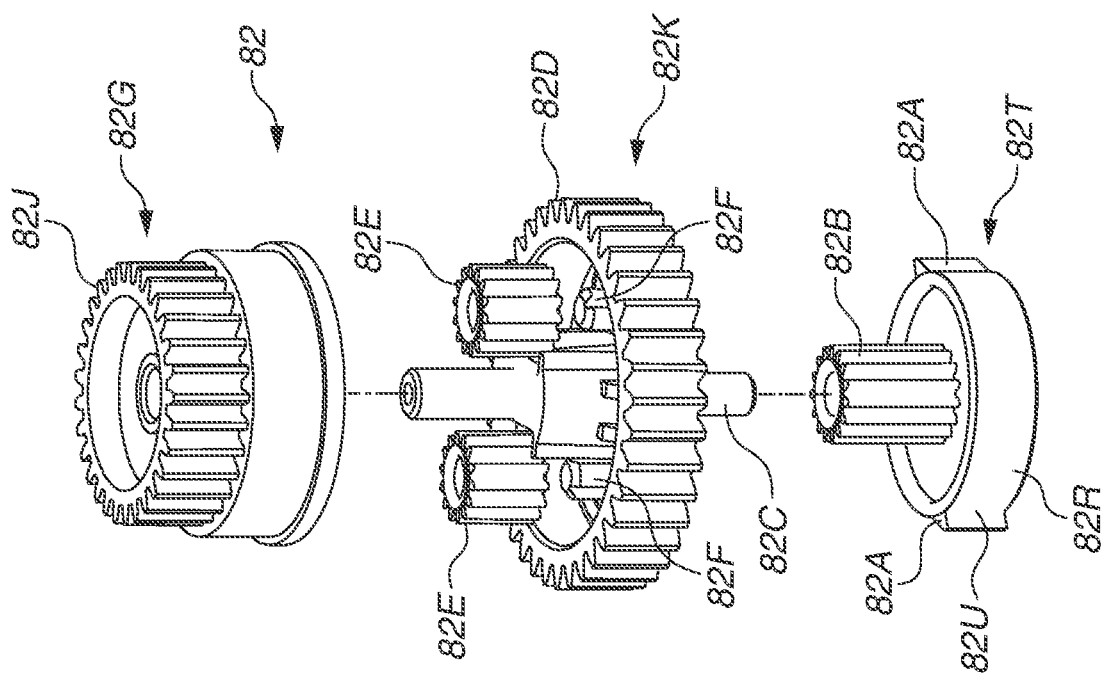

DRIVING FORCE TRANSMITTING APPARATUS, SHEET CONVEYANCE APPARATUS, AND IMAGE FORMING APPARATUS

BACKGROUND

Field

The present disclosure relates to a driving force transmitting apparatus, a sheet conveyance apparatus including the driving force transmitting apparatus, and an image forming apparatus including the driving force transmitting apparatus.

Description of the Related Art

A plurality of conveyance rollers for conveying a sheet and a conveyance roller driving mechanism for driving the conveyance rollers are arranged inside an image forming apparatus. With the use of these conveyance rollers, the sheet is conveyed from a sheet storage cassette or a sheet stacking tray sequentially to an image forming unit that forms an image and to a sheet discharge tray.

There is also an image forming apparatus that includes a conveyance unit that changes the front and back sides of a sheet and then conveys the sheet, as a standard or an option, in order to perform double-sided printing in which images are formed on both the front and back sides of the sheet. Many models of such an image forming apparatus internally perform operations of switching back a sheet whose front side is already printed by switching a rotational direction of a sheet discharge roller and sending the sheet to the image forming unit again to print on the back side of the sheet.

Examples of a method of switching the rotational direction of the sheet discharge roller include a method of controlling switching of a rotational direction of a motor that drives the sheet discharge roller, and a method of switching the rotational direction of the sheet discharge roller using a reverse driving mechanism including two sets of planetary gear units as discussed in Japanese Patent Application Laid-Open No. 2015-215090. The method discussed in Japanese Patent Application Laid-Open No. 2015-215090 eliminates the need of using a dedicated motor for switching the rotational direction of the sheet discharge roller, and thus the image forming apparatus can be manufactured at a relatively low cost.

In recent years, an image forming apparatus has been required to have a reduced distance between a pressure roller of a fixing unit and the sheet discharge roller to downsize a main body of the image forming apparatus.

However, to enable the double-sided printing while having the reduced distance between the pressure roller and the sheet discharge roller, the technique described in Japanese Patent Application Laid-Open No. 2015-215090 requires reduction of time needed to switch the rotational direction of the sheet discharge roller in performing the double-sided printing by increasing attraction force of a solenoid. At this time, in the technique of Japanese Patent Application Laid-Open No. 2015-215090, there is a case where reduction of spring force of the solenoid to increase the attraction force of the solenoid causes a claw of a stopper member to be repelled by a claw of the planetary gear unit when the stopper member is returned by the spring force. The technique of Japanese Patent Application Laid-Open No. 2015-215090 discloses that a switching operation is unstable and time needed to perform switching is increased.

SUMMARY

According to an aspect of the present disclosure, a driving force transmitting apparatus includes a first planetary gear unit including a first locked gear provided with a plurality of first locked portions, and including a first mesh gear, a second planetary gear unit including a second locked gear provided with a plurality of second locked portions, and including a second mesh gear configured to mesh with the first mesh gear, a rotation switching member including a first locking portion and a second locking portion, wherein the rotation switching member is capable of moving to (i) a first stop position at which the first locking portion locks one of the plurality of first locked portions to stop the first locked gear, and (ii) a second stop position at which the second locking portion locks one of the plurality of second locked portions to stop the second locked gear, and an urging member configured to urge the rotation switching member to the second stop position, wherein an interval between the plurality of second locked portions in a rotational direction of the second locked gear is larger than an interval between the plurality of first locked portions in a rotational direction of the first locked gear.

Further features of the present disclosure will become apparent from the following description of exemplary embodiments with reference to the attached drawings.

BRIEF DESCRIPTION OF THE DRAWINGS

FIGS. 4A and 4B are exploded perspective views each illustrating a second planetary gear unit of the driving force transmitting apparatus according to the first exemplary embodiment of the present disclosure.

DESCRIPTION OF THE EMBODIMENTS

Figure 1:
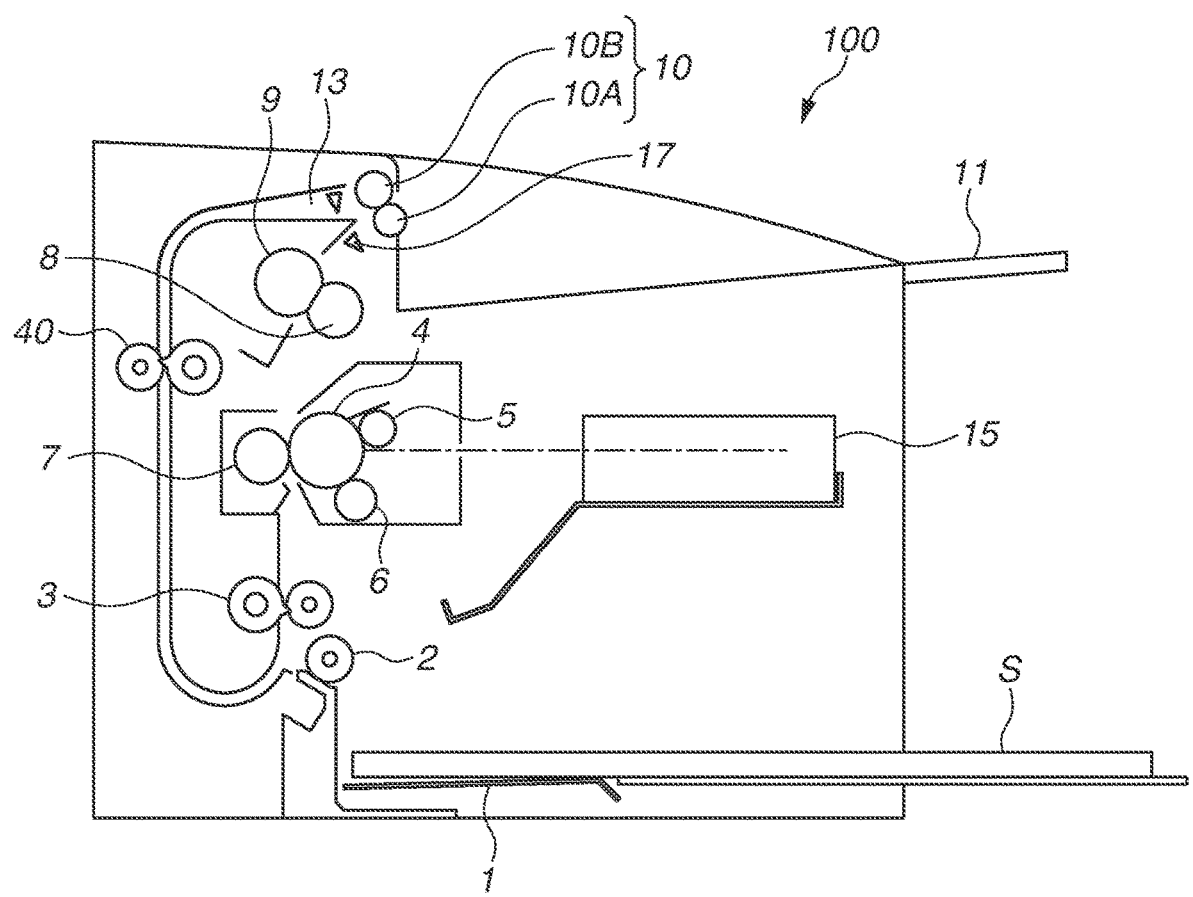
FIG. 1 is a schematic diagram illustrating an image forming apparatus according to a first exemplary embodiment of the present disclosure.

The present disclosure is directed to providing a driving force transmitting apparatus, a sheet conveyance apparatus, and an image forming apparatus that are capable of stabilizing a switching operation of a rotational direction, and also capable of preventing an increase in time required to switch the rotational direction.

Exemplary embodiments will be described in detail below with reference to the accompanying drawings.

<Configuration of Image Forming Apparatus>

A configuration of an image forming apparatus 100 according to a first exemplary embodiment of the present disclosure is described in detail with reference to FIG. 1.

The image forming apparatus 100 includes a sheet feeding device 1, a sheet feeding roller 2, a registration unit 3, a photoconductive drum 4, a charging roller 5, a development roller 6, and a transfer roller 7. In addition, the image forming apparatus 100 includes a heating unit 8, a pressure roller 9, a sheet discharge roller pair 10, a laser scanner 15, a sheet discharge sensor 17, and a double-sided registration unit 40. Furthermore, the image forming apparatus 100 includes a driving force transmitting apparatus 30 that transmits driving force to the sheet discharge roller pair 10. The driving force transmitting apparatus 30 is not illustrated in FIG. 1 and will be described below.

The registration unit 3, the driving force transmitting apparatus 30, and the double-sided registration unit 40 constitute a sheet conveyance apparatus. The photoconductive drum 4, the transfer roller 7, the heating unit 8, the pressure roller 9, and the laser scanner 15 constitute an image forming unit that forms an image on a sheet S conveyed by the sheet conveyance apparatus by an electrophotographic method. In addition, the transfer roller 7 and the heating unit 8 constitute a fixing unit. A laser beam printer is used here as an example of the image forming apparatus 100.

The sheet feeding device 1 stores the sheet S, and feeds the stored sheet S to the image forming unit sheet by sheet.

The sheet feeding roller 2 is controlled to rotate clockwise in FIG. 1 only at the time of feeding a sheet, and makes pressure-contact with the sheet S stored in the sheet feeding device 1 to feed the sheet S to the registration unit 3 by frictional force.

The registration unit 3 performs skew correction on the sheet S fed by the sheet feeding roller 2 or the sheet S conveyed by the double-sided registration unit 40, and conveys the sheet S, on which the skew correction has been performed, between the photoconductive drum 4 and the transfer roller 7 at a predetermined timing.

The photoconductive drum 4 rotates clockwise in FIG. 1, and is uniformly charged by the charging roller 5. The uniformly charged photoconductive drum 4 is exposed to light by the laser scanner 15, and an electrostatic latent image is formed thereon. The electrostatic latent image formed on the photoconductive drum 4 is developed by the development roller 6, and then a toner image (developer image) is formed on the photoconductive drum 4.

The charging roller 5 uniformly charges a surface of the photoconductive drum 4.

The development roller 6 supplies toner as a developer to the photoconductive drum 4, on which the electrostatic latent image has been formed, and develops the electrostatic latent image to form the toner image on the photoconductive drum 4.

The transfer roller 7 makes pressure-contact with the sheet S to nip the sheet S between the transfer roller 7 and the photoconductive drum 4, electrically attracts the toner image formed on the photoconductive drum 4, and transfers the toner image on the sheet S. The transfer roller 7 conveys the sheet S, to which the toner image has been transferred, to the fixing unit including the heating unit 8 and the pressure roller 9.

The heating unit 8 and the pressure roller 9 heat and apply pressure to the sheet S conveyed by the transfer roller 7 to fix the toner image, which has been transferred to the sheet S, to the sheet S. The heating unit 8 and the pressure roller 9 convey the sheet S, to which the toner image has been fixed, to the driving force transmitting apparatus 30.

The sheet discharge roller pair 10 as a conveyance member includes sheet discharge rollers 10A and 10B. The sheet discharge roller 10A rotates by driving force being transmitted thereto from the driving force transmitting apparatus 30. The sheet discharge roller 10B rotates following the rotation of the sheet discharge roller 10A. The sheet discharge roller 10A is a conveyance member that rotates forward and conveys the sheet S, which has been conveyed from the fixing unit, in one direction to discharge the sheet S to a sheet discharge tray 11, or that rotates backward and conveys the sheet S, which has been conveyed from the fixing unit, in another direction to a reversing path 13.

The laser scanner 15 irradiates the photoconductive drum 4, the surface of which is uniformly charged by the charging roller 5 in advance, with laser light and exposes the photoconductive drum 4 to light, based on an image signal from a host computer (not illustrated). As a result, the laser scanner 15 forms the electrostatic latent image on the photoconductive drum 4.

The sheet discharge sensor 17 detects the conveyed sheet S, and outputs a detection result to a control unit (not illustrated) that includes a central processing unit (CPU), a memory, and the like.

The double-sided registration unit 40 performs skew correction on the sheet S conveyed to the reversing path 13 by the driving force transmitting apparatus 30, and conveys the sheet S, on which the skew correction has been performed, to the registration unit 3 at a predetermined timing.

<Configuration of Driving Force Transmitting Apparatus>

Figure 2:
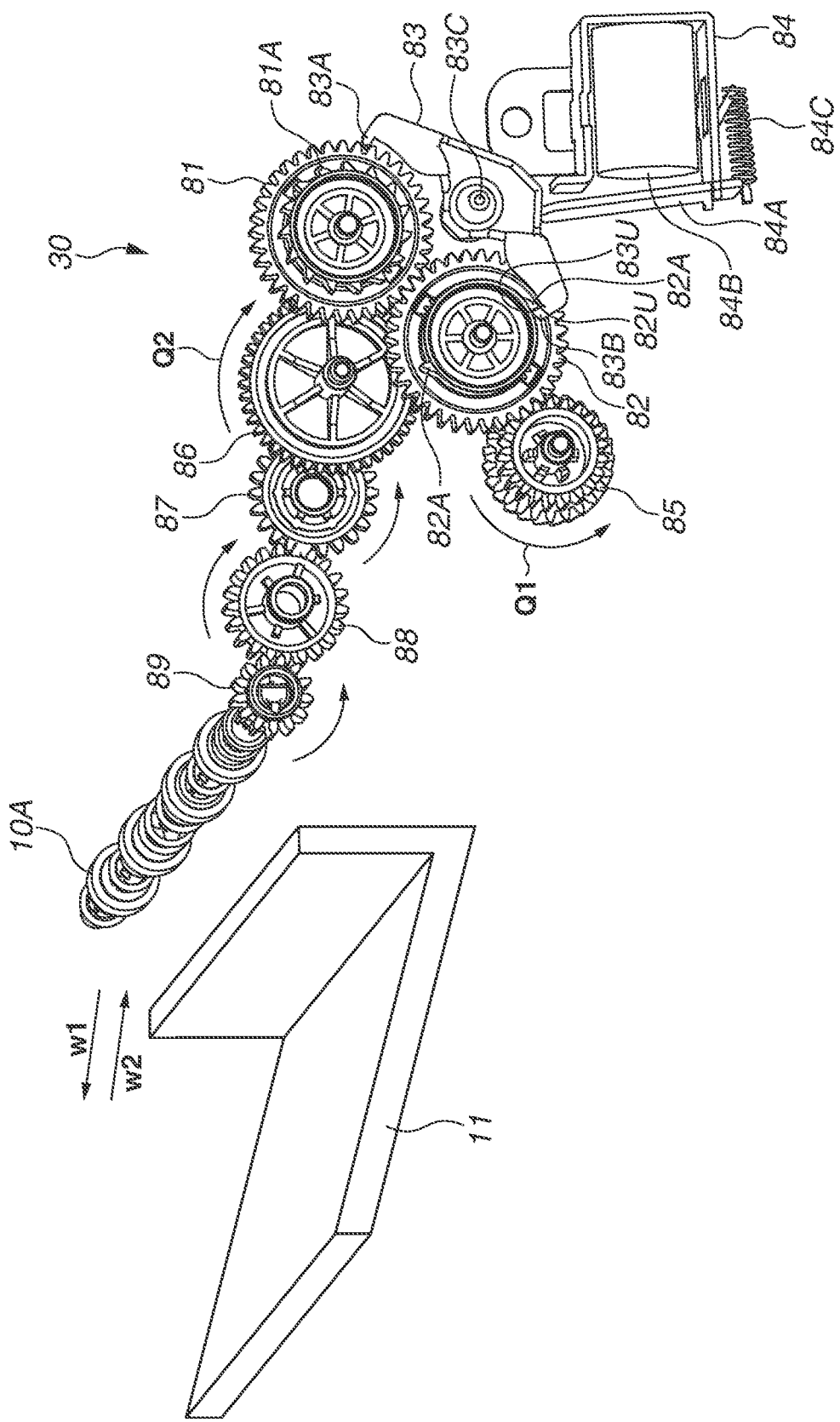
FIG. 2 is a perspective view illustrating a driving force transmitting apparatus according to the first exemplary embodiment of the present disclosure.
Figure 3B:
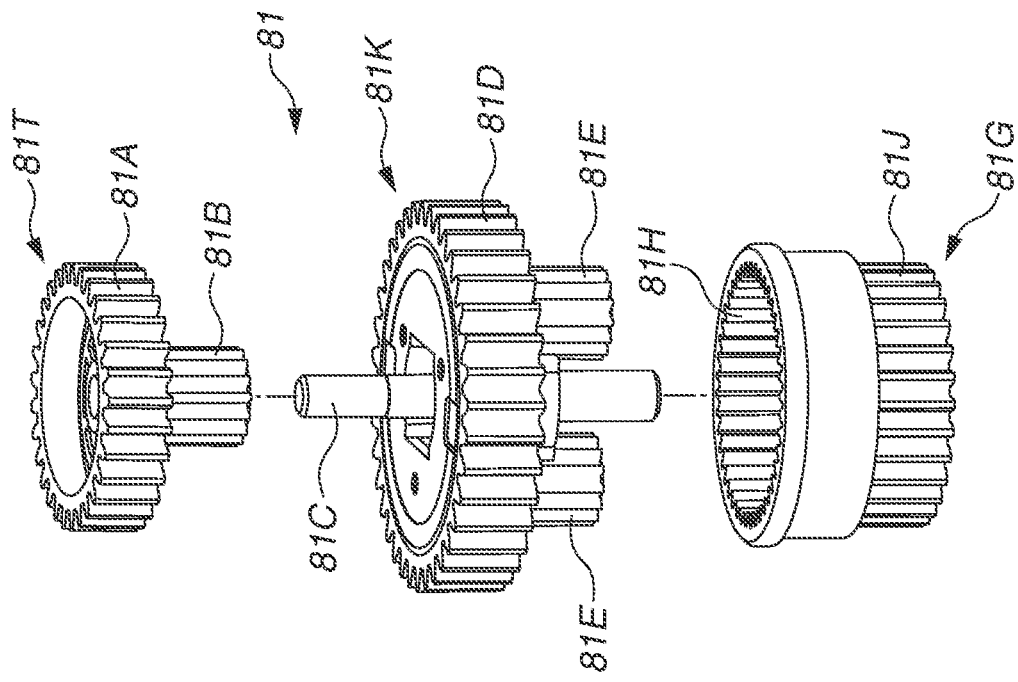
FIGS. 3A and 3B are exploded perspective views each illustrating a first planetary gear unit of the driving force transmitting apparatus according to the first exemplary embodiment of the present disclosure.
Figure 3A:
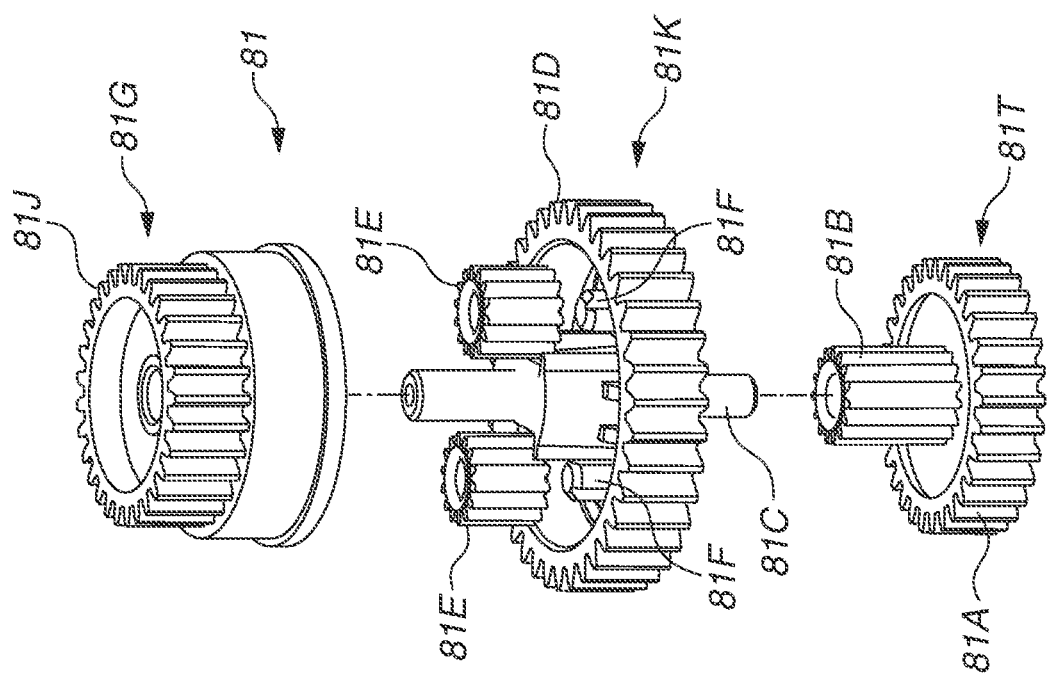

A configuration of the driving force transmitting apparatus 30 according to the first exemplary embodiment of the present disclosure is described in detail with reference to FIGS. 2 to 4B. FIG. 2 is a perspective view illustrating the driving force transmitting apparatus 30. FIGS. 3A and 3B are diagrams each illustrating a first planetary gear unit 81. FIG. 3A is the diagram viewed from an output gear portion 81J side, and FIG. 3B is the diagram viewed from a sun gear 81T side. FIGS. 4A and 4B are diagrams each illustrating a second planetary gear unit 82. FIG. 4A is the diagram viewed from an output gear portion 82J side, and FIG. 4B is the diagram viewed from a sun gear 82T side.

The driving force transmitting apparatus 30 transmits driving force from a driving source that generates the driving force by control of the control unit (not illustrated), to the sheet discharge roller 10A (see FIG. 2). Specifically, the driving force transmitting apparatus 30 includes the first planetary gear unit 81, the second planetary gear unit 82, a rotation switching member 83, a solenoid 84, a driving force input gear 85, and driving force output gears 86 to 89.

In the configuration according to the present exemplary embodiment, in a case where the solenoid 84 is in a non-energized state, a second locking portion 83B of the rotation switching member 83 locks a second locked portion 82A of the second planetary gear unit 82, and the sheet discharge roller 10A conveys the sheet S in a forward direction (a w1 direction illustrated in FIG. 2). On the other hand, in a case where the solenoid 84 is in an energized state, a first locking portion 83A of the rotation switching member 83 locks a first locked portion 81A of the first planetary gear unit 81, and the sheet discharge roller 10A conveys the sheet S in a backward direction (a w2 direction illustrated in FIG. 2).

Figure 6:
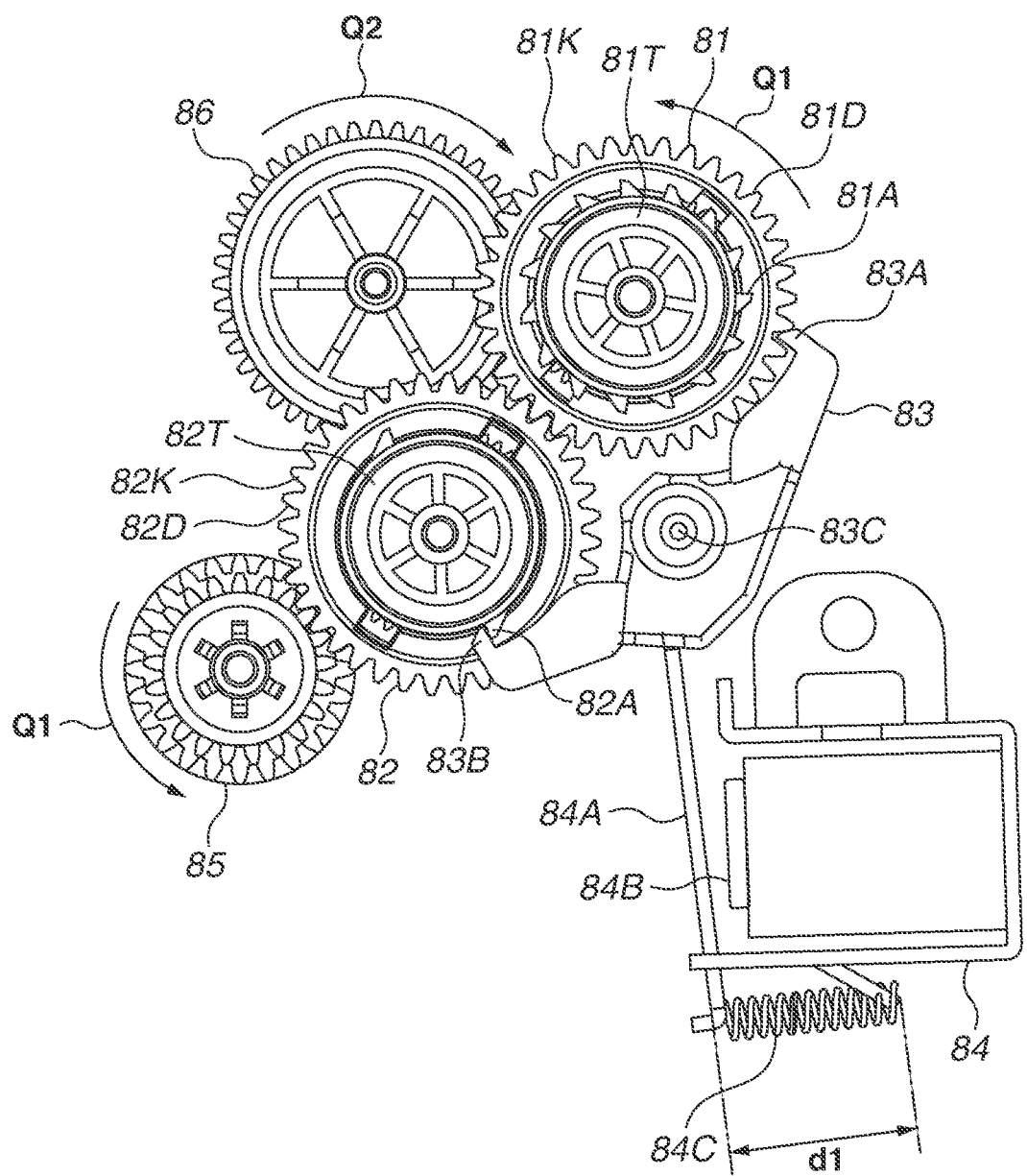
FIG. 6 is a front view illustrating a non-energized state of a solenoid in the driving force transmitting apparatus according to the first exemplary embodiment of the present disclosure.

The driving force input gear 85 meshes with an input gear portion 82D of a carrier 82K of the second planetary gear unit 82 (see FIG. 6). Rotation of the driving force input gear 85 by driving force being transmitted thereto from the driving source (not illustrated), rotates the input gear portion 82D.

The driving force output gear 86 meshes with the output gear portion 81J of an output gear 81G of the first planetary gear unit 81 and the output gear portion 82J of an output gear 82G of the second planetary gear unit 82. Rotation of the output gear portion 81J or rotation of the output gear portion 82J rotates the driving force output gear 86, thereby rotating the driving force output gear 87.

The driving force output gear 87 meshes with the driving force output gear 86. Rotation of the driving force output gear 86 rotates the driving force output gear 87, thereby rotating the driving force output gear 88.

The driving force output gear 88 meshes with the driving force output gear 87. Rotation of the driving force output gear 87 rotates the driving force output gear 88, thereby rotating the driving force output gear 89.

The driving force output gear 89 meshes with the driving force output gear 88. Rotation of the driving force output gear 88 rotates the driving force output gear 89, thereby rotating the sheet discharge roller 10A.

The driving force transmitting apparatus 30 includes a reversing unit including the first planetary gear unit 81, the second planetary gear unit 82, the rotation switching member 83, and the solenoid 84. Each constituent element of the reversing unit is described below.

The first planetary gear unit 81 includes planetary gears 81E, the output gear 81G, a carrier 81K, and the sun gear 81T, as illustrated in FIGS. 3A and 3B.

The planetary gears 81E are rotatably held by the carrier 81K, and revolve around a sun gear portion 81B held by a central shaft 81C of the carrier 81K with the rotation of the carrier 81K. The number of planetary gears 81E is not limited to two, and may be one or a freely-selected number of three or more.

The output gear 81G includes an internal tooth gear portion 81H and the output gear portion 81J, which are formed integrally and coaxially. The internal tooth gear portion 81H meshes with the external side of each of the planetary gears 81E. The output gear portion 81J meshes with the driving force output gear 86 to output driving force.

The carrier 81K as a first mesh gear includes the central shaft 81C, an input gear portion 81D, and shafts 81F, which are integrally formed. The central shaft 81C holds the sun gear portion 81B. The input gear portion 81D meshes with the carrier 82K of the second planetary gear unit 82. The shafts 81F supports the respective planetary gears 81E so that the planetary gears 81E can revolve around the sun gear portion 81B.

The sun gear 81T as a first locked gear includes the sun gear portion 81B and a plurality of first locked portions 81A, which are integrally formed. The sun gear portion 81B meshes with the planetary gears 81E. The plurality of first locked portions 81A meshes with the rotation switching member 83. The first locked portions 81A are arranged at an equal interval in a rotational direction of the sun gear 81T.

The second planetary gear unit 82 has a configuration similar to that of the first planetary gear unit 81, and includes planetary gears 82E, the output gear 82G, the carrier 82K, and the sun gear 82T, as illustrated in FIGS. 4A and 4B.

The planetary gears 82E are rotatably held by the carrier 82K, and revolves around a sun gear portion 82B held by a central shaft 82C of the carrier 82K with the rotation of the carrier 82K. The number of planetary gears 82E is not limited to two, and may be one or a freely-selected number of three or more.

The output gear 82G includes an internal tooth gear portion 82H and the output gear portion 82J, which are formed integrally and coaxially. The internal tooth gear portion 82H meshes with the external side of each of the planetary gears 82E. The output gear portion 82J meshes with the driving force output gear 86 to output driving force.

The carrier 82K as a second mesh gear includes the central shaft 82C, the input gear portion 82D, and shafts 82F, which are integrally formed. The central shaft 82C holds the sun gear portion 82B. The input gear portion 82D meshes with the carrier 81K of the first planetary gear unit 81. The shafts 82F supports the respective planetary gears 82E so that the planetary gears 82E can revolve around the sun gear portion 82B.

The sun gear 82T as a second locked gear includes the sun gear portion 82B and a plurality of second locked portions 82A, which are integrally formed. The sun gear portion 82B meshes with the planetary gears 82E. The plurality of second locked portions 82A locks the second locking portion 83B of the rotation switching member 83.

The second locked portions 82A are arranged at an equal interval in the rotational direction of the sun gear 82T. The interval between the second locked portions 82A in the rotational direction of the sun gear 82T is larger than the interval between the first locked portions 81A in the rotational direction of the sun gear 81T. The number of second locked portions 82A is smaller than the number of first locked portions 81A.

It is preferable that a leading end 82U of the second locked portion 82A and a leading end 83U of the second locking portion 83B each have a shape with the smallest possible curvature radius. The number of second locked portions 82A is exemplified here as two.

The rotation switching member 83 includes the first locking portion 83A and the second locking portion 83B, which are integrally formed (see FIG. 2). The first locking portion 83A is capable of locking the first locked portion 81A of the first planetary gear unit 81. The second locking portion 83B is capable of locking the second locked portion 82A of the second planetary gear unit 82. The rotation switching member 83 is capable of pivoting about a shaft 83C supported by a main body of the image forming apparatus 100 (not illustrated), and is connected to the solenoid 84.

The rotation switching member 83 controls the rotation of the first planetary gear unit 81 and the rotation of the second planetary gear unit 82. Specifically, in a case of being at a first stop position at which the first locking portion 83A locks the first locked portion 81A, the rotation switching member 83 restrains the rotation of the sun gear 81T of the first planetary gear unit 81, while not restraining the rotation of the sun gear 82T of the second planetary gear unit 82. In a case of being at a second stop position at which the second locking portion 83B locks the second locked portion 82A, the rotation switching member 83 restrains the rotation of the sun gear 82T of the second planetary gear unit 82, while not restraining the rotation of the sun gear 81T of the first planetary gear unit 81.

The solenoid 84 is an actuator that is electrically controlled, and includes a solenoid flapper 84A, a solenoid main body 84B, and a solenoid spring 84C.

The solenoid flapper 84A is movable by magnetic force of a coil portion (not illustrated) in the solenoid main body 84B, or urging force of the solenoid spring 84C.

The solenoid main body 84B includes the coil portion (not illustrated) that generates magnetic force in a case where the solenoid 84 is in the energized state.

The solenoid spring 84C as an urging member urges the solenoid flapper 84A, thereby the rotation switching member 83 is urged in a direction in which the second locking portion 83B thereof locks the second locked portion 82A.

<Operations of Sheet Conveyance Apparatus>

Operations of the sheet conveyance apparatus according to the first exemplary embodiment of the present disclosure are described in detail with reference to FIGS. 2 to 8B.

Figure 5A:
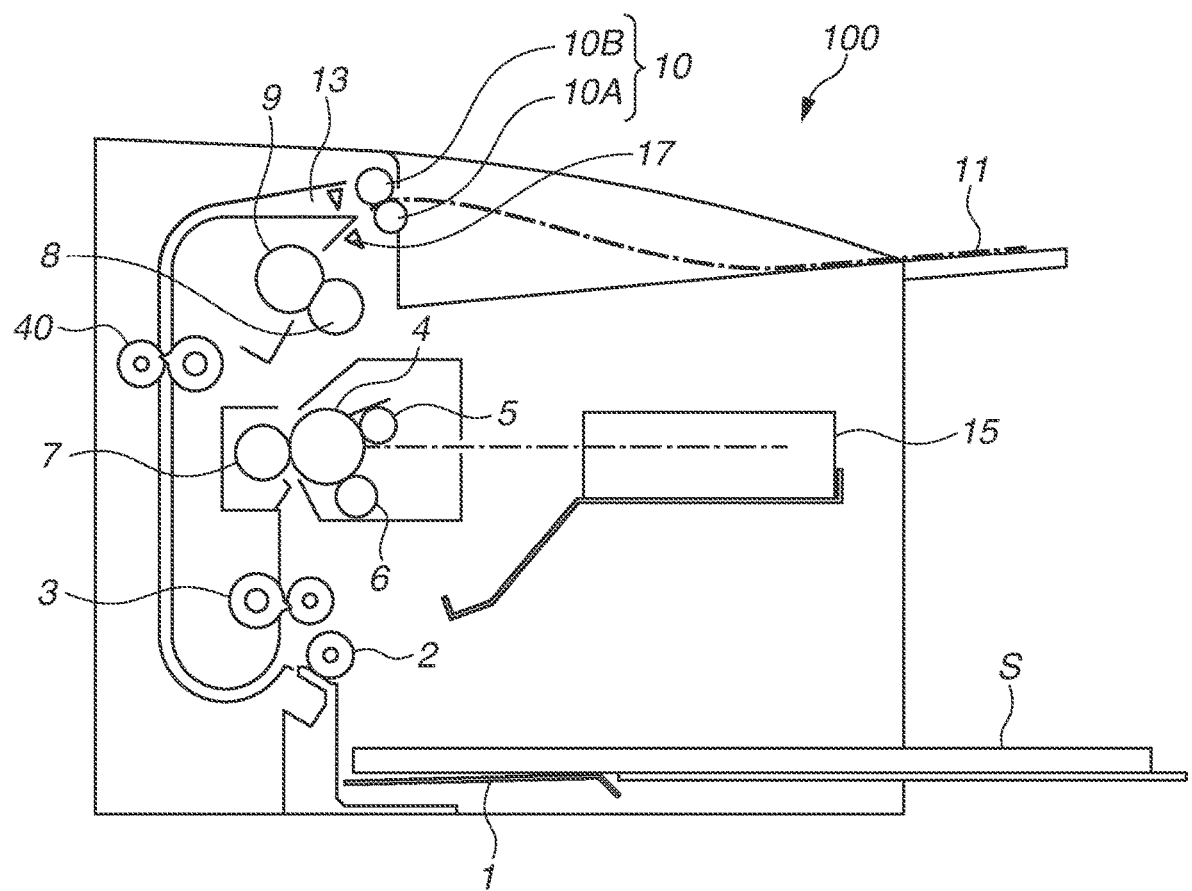
FIGS. 5A and 5B are schematic diagrams each illustrating operations of the image forming apparatus according to the first exemplary embodiment of the present disclosure.
Figure 5B:
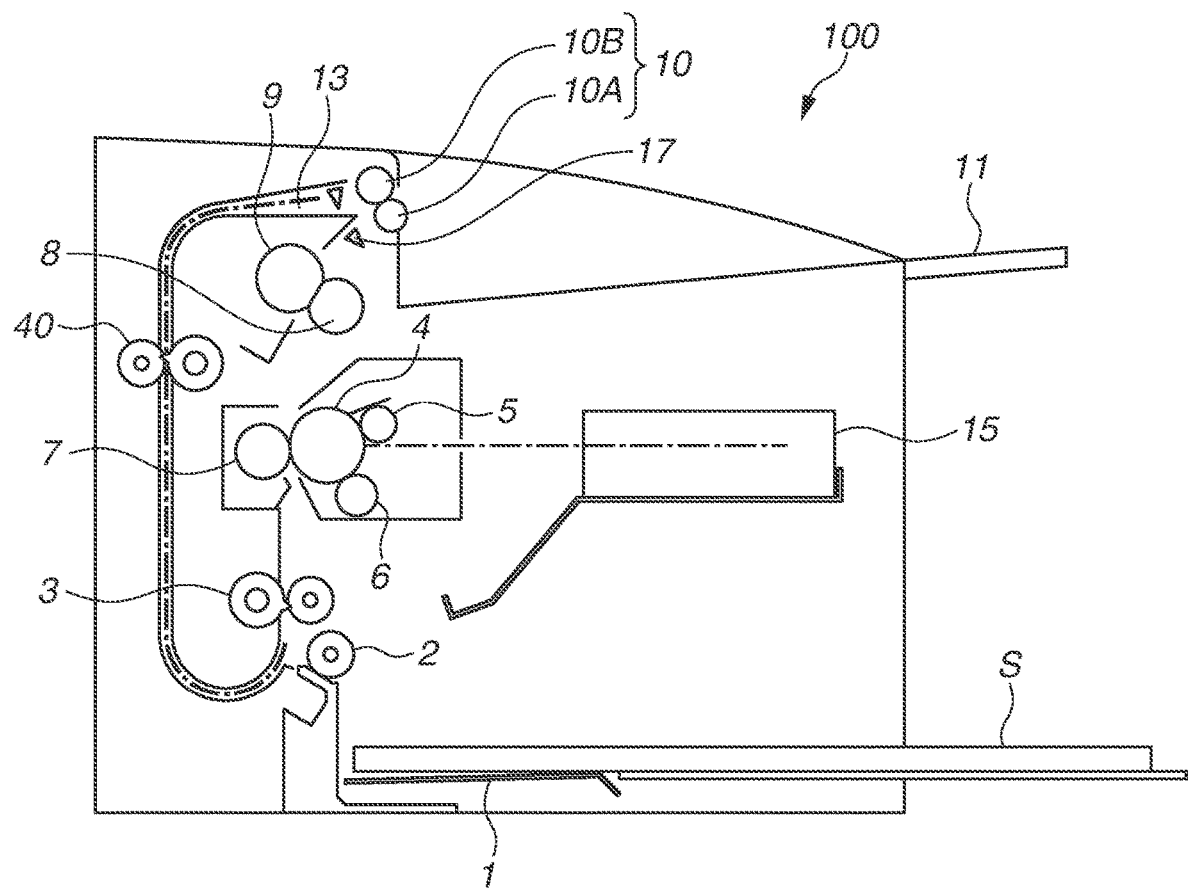

FIG. 5A illustrates a state immediately after a rear end of the sheet S in a conveying direction passes through the sheet discharge sensor 17 and before the rear end passes through the sheet discharge roller pair 10. FIG. 5B illustrates a state where the sheet S is conveyed to the reversing path 13.

First, a description is given of an operation of the sheet conveyance apparatus when a sheet discharge operation is performed (operation in the non-energized state).

When an operation of discharging the sheet S or double-sided printing is performed, the sheet discharge roller pair 10 conveys the sheet S in the w1 direction illustrated in FIG. 2 until a state immediately after the rear end in the conveying direction of the sheet S whose front side is already printed passes through the sheet discharge sensor 17 (FIG. 5A).

At this time, the solenoid 84 is in a non-energized state in which the solenoid flapper 84A is not attracted to the solenoid main body 84B. The second locking portion 83B of the rotation switching member 83 locks the second locked portion 82A of the second planetary gear unit 82 (the sun gear 82T) by urging force of the solenoid spring 84C (FIGS. 2 and 6).

With this configuration, the second locking portion 83B locks the second locked portion 82A to restrain the rotation of the sun gear 82T. Meanwhile, the first locking portion 83A does not lock the first locked portion 81A, and the rotation of the sun gear 81T is allowed.

In a case where the driving force is input from the driving force input gear 85 to the input gear portion 82D of the carrier 82K, the planetary gears 82E revolve around the sun gear portion 82B, as bearings, between the sun gear portion 82B of the sun gear 82T and the internal tooth gear portion 82H of the output gear 82G. This configuration prevents the driving force input to the input gear portion 82D of the carrier 82K from being transmitted to the output gear 82G, and furthermore, enables the output gear 82G to rotate without being interlocked with the carrier 82K.

On the other hand, the first planetary gear unit 81 has a configuration in which the first locking portion 83A of the rotation switching member 83 does not lock the first locked portion 81A of the sun gear 81T and the sun gear 81T is rotatable. As a result, the sun gear 81T rotates with the carrier 81K by frictional force on a contact surface of the sun gear 81T with the carrier 81K. In other words, the sun gear 81T and the two planetary gears 81E are integrally rotatable without a change in positions relative to the carrier 81K.

With this configuration, the driving force input from the driving force input gear 85 is input to the input gear portion 81D of the carrier 81K via the input gear portion 82D, and transmitted to the output gear 81G by the planetary gears 81E, which integrally rotate with the carrier 81K, meshing with the internal tooth gear portion 81H. In other words, the sun gear 81T, the two planetary gears 81E, the carrier 81K, and the output gear 81G rotate integrally without a change in positions of meshing between corresponding members, and furthermore, without a change in relative positions.

In this state (the state illustrated in FIG. 6), the driving force input gear 85 that rotates counterclockwise (in a Q1 direction) rotates the carrier 82K of the second planetary gear unit 82 clockwise (in a Q2 direction). With this rotation, the planetary gears 82E revolve around the sun gear portion 82B of the sun gear 82T, the rotation of which is restrained, as bearings, and the output gear portion 82J, to which driving force is not transmitted, is rotatable independently of the carrier 82K.

The carrier 82K that rotates clockwise (in the Q2 direction) rotates the carrier 81K of the first planetary gear unit 81 counterclockwise (in the Q1 direction). The first planetary gear unit 81 integrally rotates without a change in positions of meshing between corresponding members that constitute the first planetary gear unit 81, and furthermore, the output gear portion 81J rotates counterclockwise (in the Q1 direction).

The driving force output gear 86, which meshes with the output gear portion 81J, rotates clockwise, and the driving force output gear 87, which meshes with the driving force output gear 86, rotates counterclockwise. The driving force output gear 88, which meshes with the driving force output gear 87, rotates clockwise, and the driving force output gear 89, which meshes with the driving force output gear 88, rotates counterclockwise.

With this configuration, the sheet discharge roller 10A rotates in a direction to discharge the sheet S to the sheet discharge tray 11, and the sheet S is conveyed in the w1 direction in FIG. 2 to be discharged to the sheet discharge tray 11.

Next, a description is given of an operation of the sheet conveyance apparatus during an inverting operation (operation in the energized state).

At the time of double-sided printing, immediately after the rear end of the sheet S whose front side is already printed passes through the sheet discharge sensor 17 and before the rear end thereof passes through the sheet discharge roller pair 10, the sheet conveyance apparatus conveys the sheet S in the w2 direction illustrated in FIG. 2 to the reversing path 13.

Figure 7:
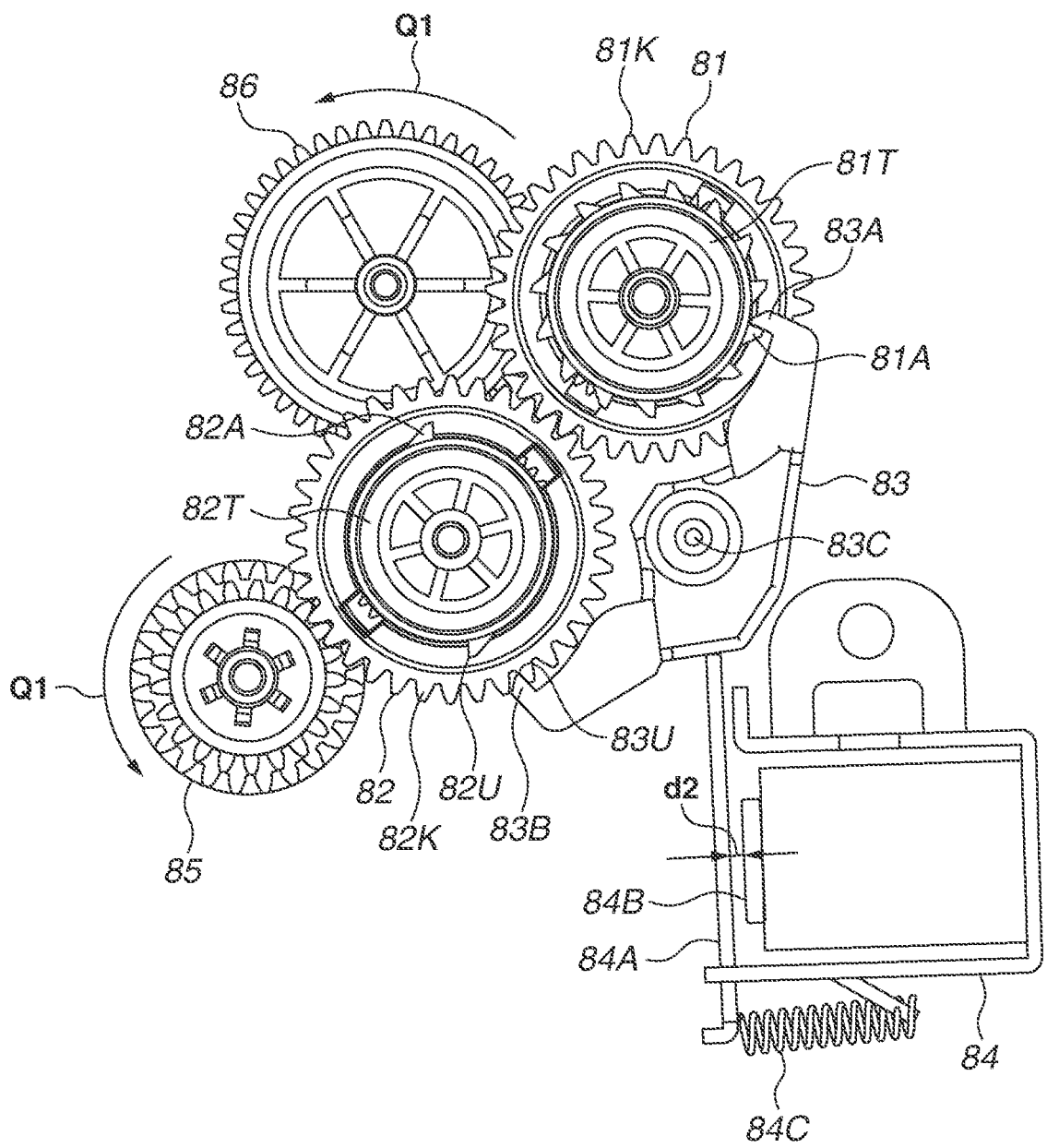
FIG. 7 is a front view illustrating an energized state of the solenoid in the driving force transmitting apparatus according to the first exemplary embodiment of the present disclosure.

At this time, the solenoid 84 is in the energized state in which the solenoid flapper 84A is attracted to the solenoid main body 84B. The first locking portion 83A of the rotation switching member 83 locks the first locked portion 81A of the first planetary gear unit 81 (the sun gear 81T) (FIG. 7).

With this configuration, the first locking portion 83A meshes with the first locked portion 81A to restrain the rotation of the sun gear 81T. On the other hand, the second planetary gear unit 82 has a configuration in which the second locking portion 83B of the rotation switching member 83 does not lock the second locked portion 82A of the sun gear 82T and the sun gear 82T is rotatable. As a result, the sun gear 82T rotates with the carrier 82K by frictional force on a contact surface of the sun gear 82T with the carrier 82K. In other words, the sun gear 82T and the two planetary gears 82E are integrally rotatable without a change in positions relative to the carrier 82K.

With this configuration, the driving force input from the driving force input gear 85 is input to the input gear portion 82D of the carrier 82K, and transmitted to the output gear 82G by the planetary gears 82E, which integrally rotate with the carrier 82K, meshing with the internal tooth gear portion 82H. In other words, the sun gear 82T, the two planetary gears 82E, the carrier 82K, and the output gear 82G rotate integrally without a change in positions of meshing between corresponding members, and furthermore, without a change in relative positions.

In the case where the driving force is input from the driving force input gear 85 to the input gear portion 81D of the carrier 81K via the carrier 82K, the planetary gears 81E revolve around the sun gear portion 81B, as bearings, between the sun gear portion 81B and the internal tooth gear portion 81H. This configuration prevents the driving force input to the input gear portion 81D of the carrier 81K from being transmitted to the output gear 81G, and furthermore, enables the output gear 81G to rotate without being interlocked with the carrier 81K.

In this state (the state illustrated in FIG. 7), the driving force input gear 85 that rotates counterclockwise (in the Q1 direction) rotates the carrier 82K of the second planetary gear unit 82 clockwise. With this rotation, the second planetary gear unit 82 integrally rotates without a change in positions of meshing between corresponding members that constitute the second planetary gear unit 82, and furthermore, the output gear portion 82J rotates clockwise (in the Q2 direction).

On the other hand, the carrier 82K, which rotates clockwise (in the Q2 direction), rotates the carrier 81K of the first planetary gear unit 81 and the driving force output gear 86 counterclockwise (in the Q1 direction). At this time, the planetary gears 81E revolve around the sun gear portion 81B of the sun gear 81T, the rotation of which is restrained, as bearings, and the output gear portion 81J, to which driving force is not transmitted, is rotatable independently of the carrier 81K.

The driving force output gear 86, which meshes with the output gear portion 82J, rotates counterclockwise, and the driving force output gear 87, which meshes with the driving force output gear 86, rotates clockwise. The driving force output gear 88, which meshes with the driving force output gear 87, rotates counterclockwise, and the driving force output gear 89, which meshes with the driving force output gear 88, rotates clockwise.

With this configuration, the sheet discharge roller 10A rotates in a direction to pull back the sheet S from the sheet discharge tray 11, and the sheet S is conveyed in the w2 direction in FIG. 2 to the reversing path 13.

Figure 8A:
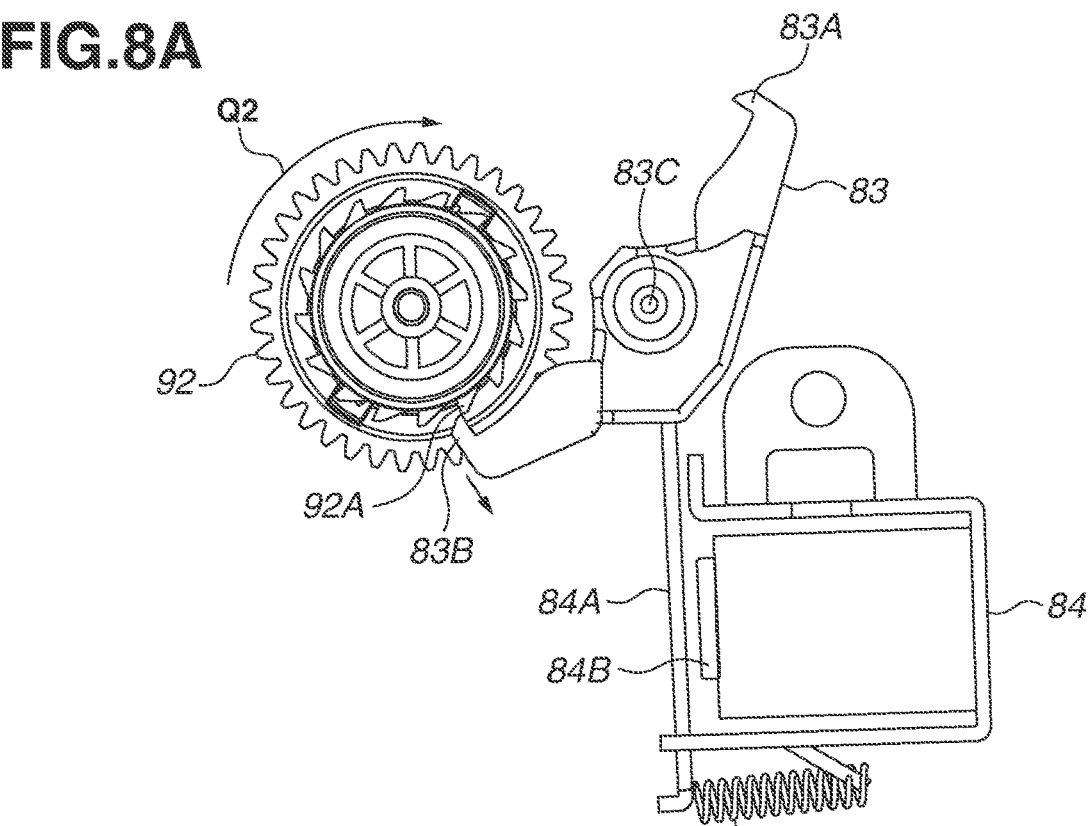
FIGS. 8A and 8B are front views each illustrating operations of the driving force transmitting apparatus according to the first exemplary embodiment of the present disclosure.
Figure 8B:
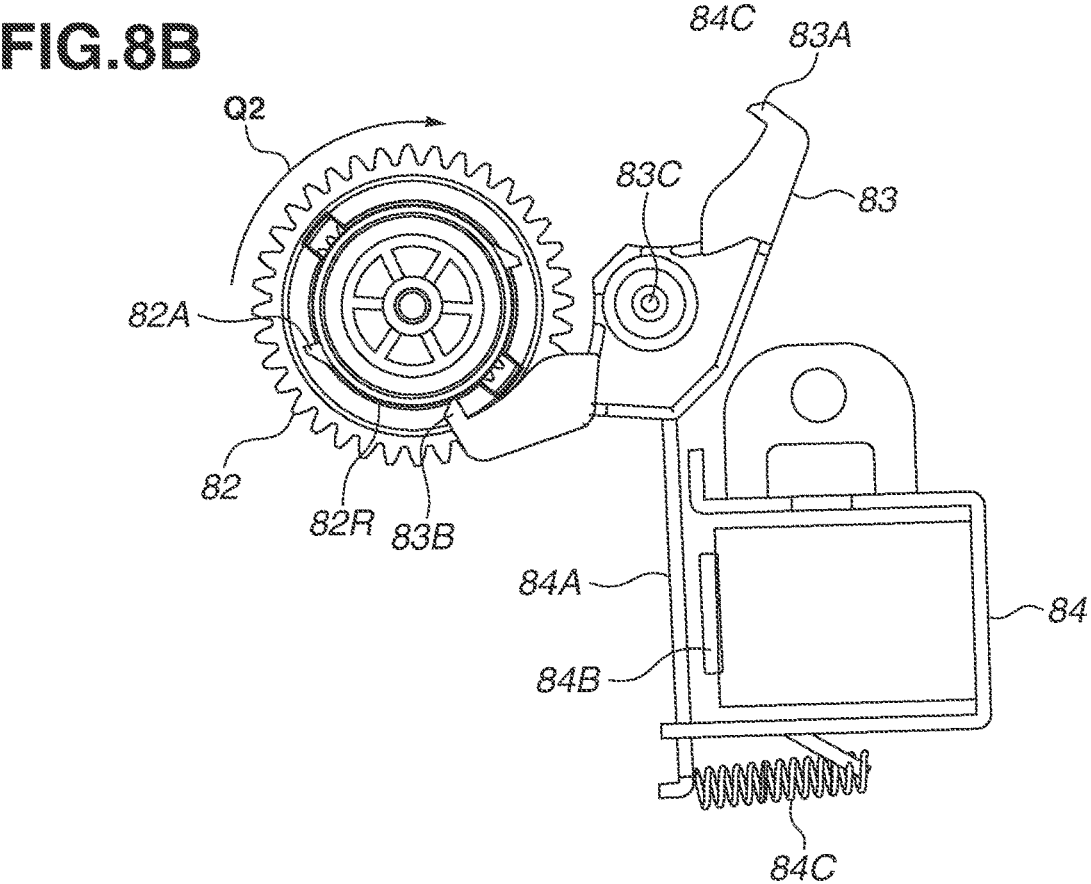

Then, operations of feature portions of the configuration according to the present exemplary embodiment are described. FIG. 8A illustrates a configuration using a second planetary gear unit 92 according to a comparative example including second locked portions 92A, the number of which is greater than that of the second locked portions 82A according to the present exemplary embodiment. FIG. 8B illustrates a configuration of using the second locked portions 82A according to the present exemplary embodiment.

The solenoid 84, when being switched from the non-energized state to the energized state, attracts the solenoid flapper 84A with magnetic force of the coil portion (not illustrated) of the solenoid main body 84B, while resisting urging force of the solenoid spring 84C, to cause the rotation switching member 83 to pivot. In the rotation switching member 83, which is caused to pivot by the solenoid flapper 84A, the first locking portion 83A locks the first locked portion 81A after the second locking portion 83B passes through the second locked portion 82A, as illustrated in FIG. 7.

At this time, since a distance d2 (see FIG. 7) between the solenoid flapper 84A and the solenoid main body 84B of the solenoid 84 is short, the magnetic force of the solenoid 84 attracting the solenoid flapper 84A is large. Hence, force generated by the solenoid 84 to cause the rotation switching member 83 to pivot is large at a moment when the first locking portion 83A locks the first locked portion 81A, and the solenoid 84 thereby allows the first locking portion 83A to lock the rotating first locked portion 81A without the first locking portion 83A being repelled by the first locked portion 81A.

With this configuration, an interval between the first locked portions 81A can be made as small as possible to be an interval that allows the first locking portion 83A to lock the first locked portion 81A. Since the interval between the first locked portions 81A can be made as small as possible, time to switch the rotational direction of the sheet discharge roller 10A to a counterclockwise direction in FIG. 5A and FIG. 5B can be made as short as possible.

When being switched from the energized state to the non-energized state, the solenoid 84 causes the solenoid flapper 84A to pivot by urging force of the solenoid spring 84C, thereby causing the rotation switching member 83 to pivot. In the rotation switching member 83, the second locking portion 83B locks the second locked portion 82A after the first locking portion 83A passes through the first locked portion 81A, as illustrated in FIG. 6.

At this time, force generated by the solenoid 84 to cause the rotation switching member 83 to pivot is small at a moment when the second locking portion 83B locks the second locked portion 82A, and force to cause the second locking portion 83B to lock the second locked portion 82A is weak. The following points are given as the reasons for the weak force. The first point is that spring force of the solenoid spring 84C, serving as reaction force, is reduced to increase attraction force of the solenoid 84. The second point is that an action length d1 (see FIG. 6) of the solenoid spring 84C is large at a moment when the second locking portion 83B locks the second locked portion 82A.

Consequently, the second locking portion 83B is repelled by the rotating second locked portion 82A when the leading end of the second locking portion 83B hits the second locked portion 82A, and thus cannot lock the second locked portion 82A.

For example, in a case where the number of second locked portions 92A is large as illustrated in FIG. 8A, the second locking portion 83B is repelled by one of the second locked portions 92A, pushed back by urging force of the solenoid spring 84C, and then tries to lock the second locked portion 92A again. At this time, there is a case where the second locking portion 83B is repelled by another second locked portion 92A when the leading end thereof hits the second locked portion 92A. In a case where such a situation repeatedly occurs, the second locking portion 83B cannot lock the second locked portion 92A even after the second planetary gear unit 92 rotates several times, and thus the leading end of the sheet S in the conveying direction may reach the sheet discharge roller pair 10 during this period of time. In this case, the sheet S cannot be discharged to the sheet discharge tray 11, resulting in occurrence of a paper jam that cannot be cleared by a user.

To address such a case, the present exemplary embodiment has a configuration in which the interval between the second locked portions 82A in the rotational direction of the sun gear 82T is increased. With this configuration, even if the second locking portion 83B is repelled by the second locked portion 82A, the second locking portion 83B subsequently hits an outer peripheral surface 82R (see FIG. 8B) between the second locked portions 82A when pushed back by spring force of the solenoid spring 84C, and thus is not repelled by the other second locked portion 82A.

Specifically, it is effective to arrange the two second locked portions 82A at an interval of 180 degrees, as illustrated in FIG. 8B. In this case, the configuration can make time required for the second locking portion 83B to lock the second locked portion 82A shorter than time required for the second planetary gear unit 82 to rotate one-half turn. This enables switching of the rotational direction of the sheet discharge roller 10A before the leading end of the sheet S in the conveying direction reaches the sheet discharge roller pair 10.

To reduce time to switch the rotational direction of the sheet discharge roller 10A using the solenoid 84 having small magnetic force, reaction force of the solenoid spring 84C needs to be made as small as possible. Also in this case, even if the second locking portion 83B is repelled by the second locked portion 82A, increasing the interval between the second locked portions 82A causes the second locking portion 83B to subsequently hit the outer peripheral surface 82R between the second locked portions 82A, and thus is not repelled by the other second locked portion 82A.

In this manner, in the present exemplary embodiment, the time to switch the rotational direction of the sheet discharge roller 10A can be minimized using the solenoid 84 that is inexpensive and compact in size and that generates small magnetic force. The configuration can prevent occurrence of a paper jam that cannot be cleared by a user as a result of failure to discharge the sheet S to the sheet discharge tray 11. In addition, use of the solenoid 84 that generates weak magnetic force can reduce power consumption and also reduce a switching sound at the time of switching the rotational direction of the sheet discharge roller 10A.

The number of second locked portions 82A is not limited to two. It is possible to set the number of second locked portions 82A to a number that allows the second locking portion 83B, which is repelled once by the second locked portion 82A, to subsequently hit the outer peripheral surface 82R of the sun gear 82T.

Specifically, in a case where the number of second locked portions 82A is n, maximum time required to switch the rotational direction of the sheet discharge roller 10A is 1/n times a rotational period of the second planetary gear unit 82. At this time, in a case where the second locking portion 83B is repelled once by the second locked portion 82A and then returns after the second planetary gear unit 82 rotates one-quarter turn, the number of second locked portions 82A can be set to four; however, the number of second locked portions 82A can be set to two in consideration of variation or the like.

The number of second locked portions 82A may be one as long as the time required to switch the rotational direction of the sheet discharge roller 10A allows for time corresponding to one turn of the rotation of the second planetary gear unit 82. In this case, the second locked portion 82A is arranged at an interval corresponding to substantially the entire circumference of the sun gear 82T.

Additionally, in the present exemplary embodiment, it is preferable that the leading end 82U of the second locked portion 82A and the leading end 83U of the second locking portion 83B each have a shape with the smallest possible curvature radius. This configuration can lower a probability that the leading end 82U of the second locked portion 82A hits the leading end 83U of the second locking portion 83B at the time of switching the rotational direction of the sheet discharge roller 10A and can make the second locking portion 83B unlikely to be repelled by the second locked portion 82A.

In the above description of the operations of the driving force transmitting apparatus 30, the sheet S is conveyed in the w1 direction to be discharged to the sheet discharge tray 11 in the case where the second locking portion 83B locks the second locked portion 82A, but the configuration is not limited thereto. The sheet S may be conveyed to the reversing path 13 (in the w2 direction). In this case, for example, the driving force transmitting apparatus 30 has a configuration in which the driving force output gear 89 is removed and in which the rotational direction of the sheet discharge roller 10A is the same as the rotational direction of the driving force output gear 88. Alternatively, the driving force transmitting apparatus 30 has a configuration in which the position of the sheet discharge roller 10A and the position of the sheet discharge roller 10B are exchanged with each other.

In the case where the leading end of the second locking portion 83B hits the second locked portion 82A and the second locking portion 83B is repelled by the second locked portion 82A, this configuration can prevent an error of not conveying the sheet S to the reversing path 13 and thus performing only single-sided printing from occurring.

Figure 9:
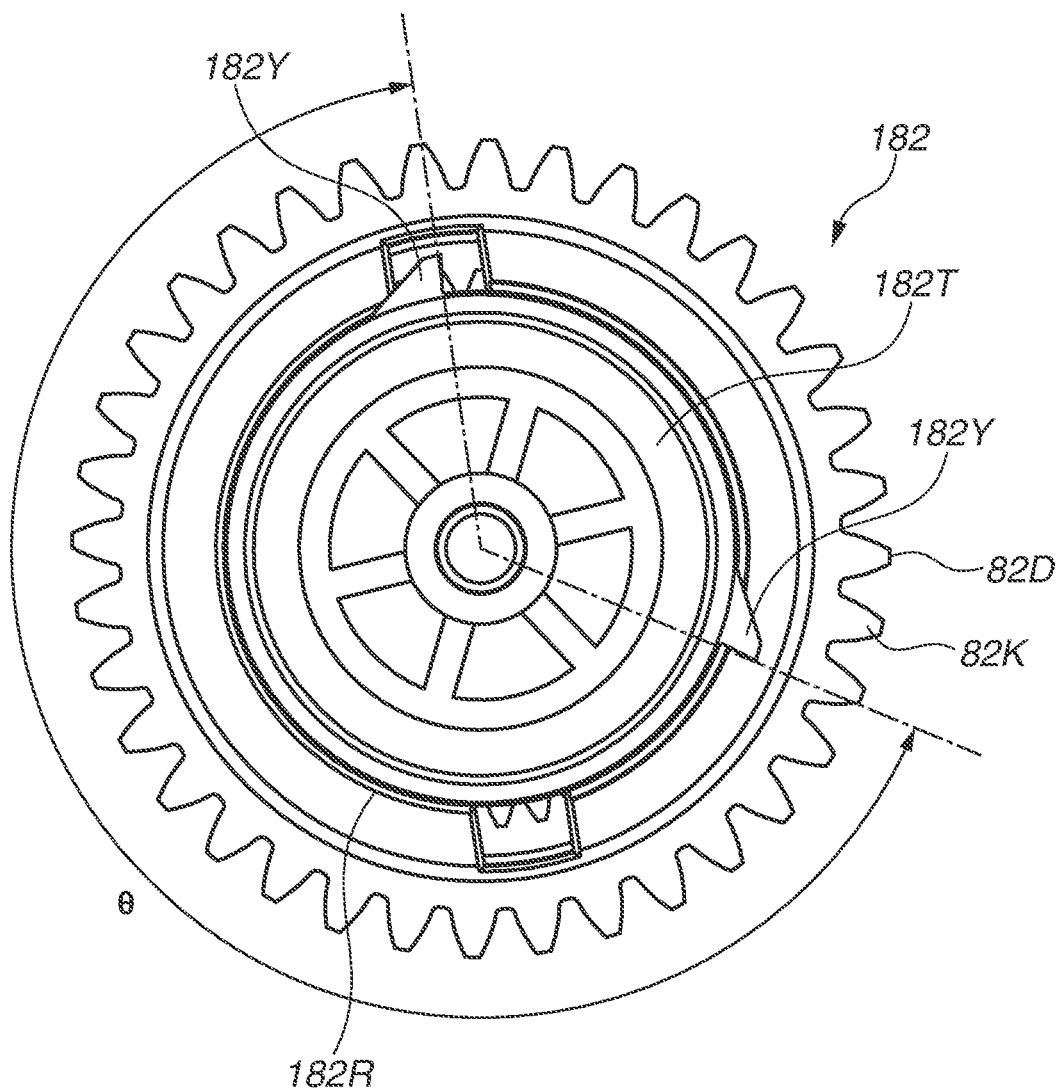
FIG. 9 is a modification of part of a planetary gear unit of the driving force transmitting apparatus according to the first exemplary embodiment of the present disclosure.

While the second locked portions 82A are arranged at an equal interval in the present exemplary embodiment described above, second locked portions 182Y may be arranged at an unequal interval in the rotational direction of the sun gear 82T as in a modification illustrated in FIG. 9. In this case, as the interval between the second locked portions 182Y, at least the largest interval θ that enables the second locking portion 83B to hit an outer peripheral surface 182R of a sun gear 182T after being repelled once by one of the second locked portions 182Y.

With this configuration, if the second locking portion 83B is repelled by one of the second locked portions 182Y, the second locking portion 83B hits the outer peripheral surface 182R in the interval θ, and then locks the other of the second locked portions 182Y. As a result, the second locking portion 83B can lock the second locked portion 182Y in time shorter than time corresponding to one turn of the rotation of a second planetary gear unit 182. The interval θ can be determined depending on rotation speed of the second planetary gear unit 182 or spring force of the solenoid spring 84C.

In the present exemplary embodiment, the driving force transmitting apparatus 30 includes the rotation switching member 83 that can move to the first stop position and the second stop position. At the first stop position, the first locking portion 83A locks the first locked portion 81A to stop the sun gear 81T. At the second stop position, the second locking portion 83B locks the second locked portion 82A to stop the sun gear 82T. In addition, the driving force transmitting apparatus 30 includes the solenoid spring 84C that urges the rotation switching member 83 to the second stop position. Furthermore, the interval between the second locked portions 82A in the rotational direction of the sun gear 82T is larger than the interval between the first locked portions 81A in the rotational direction of the sun gear 81T. This configuration can stabilize the switching operation of the rotational direction and can prevent an increase in time required to switch the rotational direction.

A configuration of an image forming apparatus according to a second exemplary embodiment of the present disclosure is identical to that of the image forming apparatus 100 illustrated in FIG. 1, and thus a description thereof is omitted.

<Configuration of Driving Force Transmitting Apparatus>

Figure 10A:
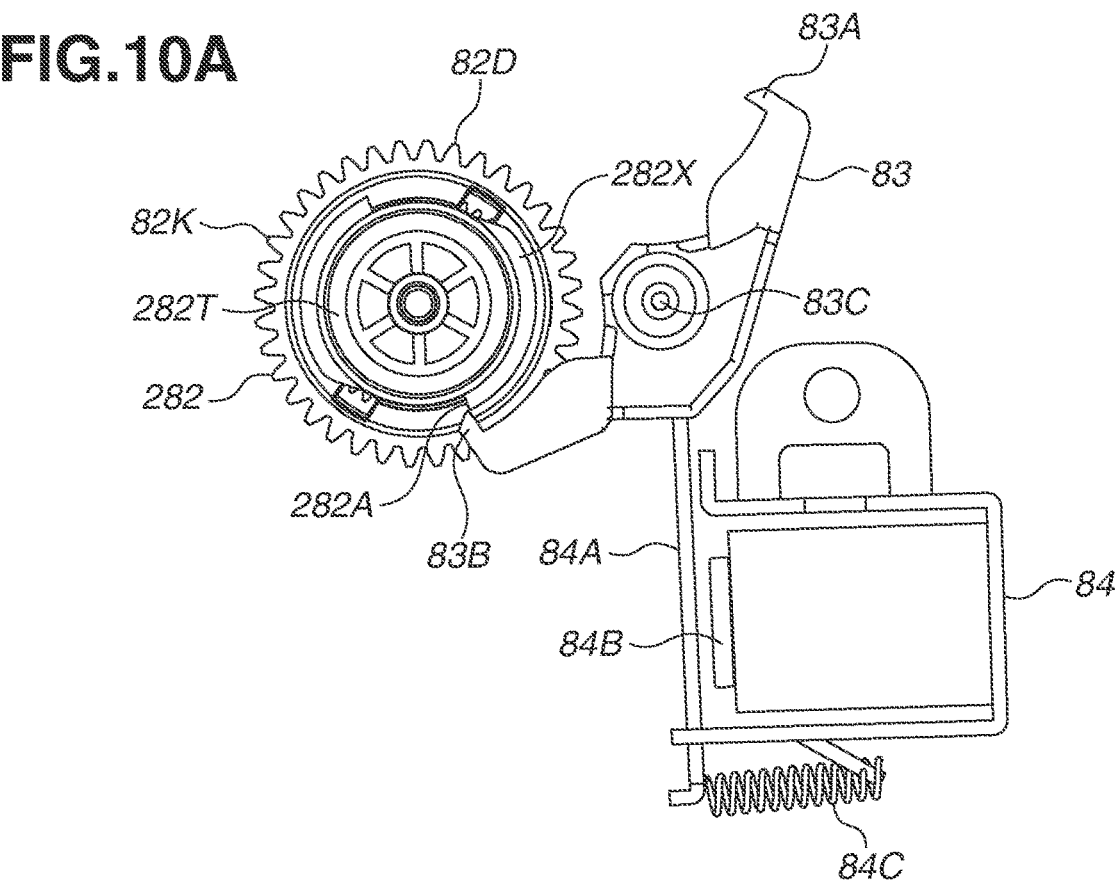
FIGS. 10A and 10B are front views each illustrating part of a driving force transmitting apparatus according to a second exemplary embodiment of the present disclosure.
Figure 10B:
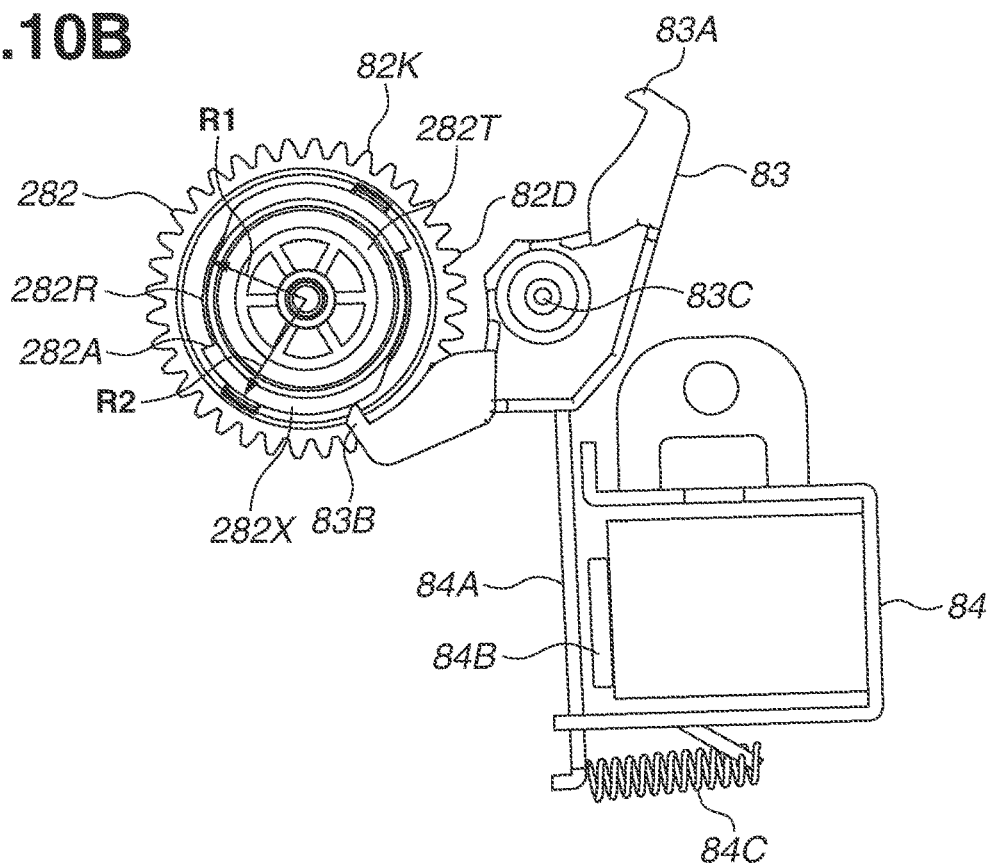

A configuration of a driving force transmitting apparatus 130 according to the second exemplary embodiment of the present disclosure is described in detail with reference to FIGS. 10A and 10B. FIG. 10A illustrates a state where the second locking portion 83B is in contact with a second locked portion 282A. FIG. 10B illustrates a state where the second locking portion 83B is repelled by the second locked portion 282A and then returned by spring force of the solenoid spring 84C.

In FIGS. 10A and 10B, a constituent element identical to that illustrated in FIGS. 8A and 8B is denoted by the same reference sign as in FIGS. 8A and 8B, and a description thereof is omitted.

The driving force transmitting apparatus 130 includes the first planetary gear unit 81, the rotation switching member 83, the solenoid 84, the driving force input gear 85, the driving force output gears 86 to 89, and a second planetary gear unit 282.

The second planetary gear unit 282 includes the planetary gears 82E, the output gear 82G, the carrier 82K, and a sun gear 282T.

The sun gear 282T includes the sun gear portion 82B (not illustrated in FIGS. 10A and 10B), the second locked portion 282A, and a protruded portion 282X, which are integrally formed. The sun gear portion 82B meshes with the planetary gears 82E. The second locked portion 282A is locked by the second locking portion 83B of the rotation switching member 83.

The second locked portion 282A is arranged at an end portion of the protruded portion 282X in the rotational direction of the sun gear 282T. The interval between second locked portions 282A in the rotational direction of the sun gear 282T is larger than the interval between the first locked portions 81A in the rotational direction of the sun gear 81T. It is preferable that the leading end of the second locked portion 282A and the leading end of the second locking portion 83B each have a shape having a corner with the smallest possible curvature radius. The number of second locked portions 282A is two, for example.

The protruded portion 282X protrudes in a radial direction from an outer peripheral surface 282R that comes in contact with the second locking portion 83B of the rotation switching member 83.

The rotation switching member 83 includes the first locking portion 83A and the second locking portion 83B, which are integrally formed. The first locking portion 83A is capable of locking the first locked portion 81A of the first planetary gear unit 81. The second locking portion 83B is capable of locking the second locked portion 282A of the second planetary gear unit 282.

The rotation switching member 83 controls rotation of the first planetary gear unit 81 and rotation of the second planetary gear unit 282. Specifically, in a case where the first locking portion 83A locks the first locked portion 81A, the rotation switching member 83 restrains the rotation of the sun gear 81T of the first planetary gear unit 81, while not restraining the rotation of the sun gear 282T of the second planetary gear unit 282. In a case where the second locking portion 83B locks the second locked portion 282A, the rotation switching member 83 restrains the rotation of the sun gear 282T of the second planetary gear unit 282, while not restraining the rotation of the sun gear 81T of the first planetary gear unit 81.

In a case where the solenoid 84 is in the non-energized state in which the solenoid flapper 84A is not attracted to the solenoid main body 84B, the second locking portion 83B of the rotation switching member 83 locks the second locked portion 282A of the second planetary gear unit 282.

The driving force input gear 85 meshes with the input gear portion 82D of the carrier 82K of the second planetary gear unit 282.

The driving force output gear 86 meshes with the output gear portion 81J of the output gear 81G of the first planetary gear unit 81 and the output gear portion 82J of the output gear 82G of the second planetary gear unit 282.

Operations of the sheet conveyance apparatus according to the present exemplary embodiment are identical to the operations of the sheet conveyance apparatus according to the first exemplary embodiment described above, and thus a description thereof is omitted.

<Operations of Driving Force Transmitting Apparatus>

Operations of the driving force transmitting apparatus 130 according to the second exemplary embodiment are described in detail with reference to FIGS. 10A and 10B.

When being switched from the energized state to the non-energized state, the solenoid 84 causes the solenoid flapper 84A to pivot by urging force of the solenoid spring 84C, thereby causing the rotation switching member 83 to pivot. In the rotation switching member 83, which is caused to pivot by the solenoid flapper 84A, the second locking portion 83B locks the second locked portion 282A after the first locking portion 83A passes through the first locked portion 81A.

At this time, force generated by the solenoid 84 to cause the rotation switching member 83 to pivot is small at a moment when the second locking portion 83B locks the second locked portion 282A, and thus force to cause the second locking portion 83B to lock the second locked portion 282A is weak.

Consequently, the second locking portion 83B is repelled by the rotating second locked portion 282A when the leading end of the second locking portion 83B hits the second locked portion 282A as illustrated in FIG. 10A, and thus cannot lock the second locked portion 282A.

To address such a case, the present exemplary embodiment has a configuration in which the interval between second locked portions 282A in the rotational direction of the sun gear 282T is increased. Increasing the interval between the second locked portions 282A allows the second locking portion 83B to hit the outer peripheral surface 282R between the second locked portions 282A when the second locking portion 83B is returned by spring force of the solenoid spring 84C after the second locking portion 83B is repelled by the second locked portion 282A, and thus prevents the second locking portion 83B from being repelled again.

After being repelled by the second locked portion 282A, the second locking portion 83B hits the protruded portion 282X when being returned by the solenoid spring 84C, as illustrated in FIG. 10B, and subsequently locks the second locked portion 282A. At this time, a pivoting amount of the rotation switching member 83 is smaller than that according to the first exemplary embodiment described above by (R2−R1), where R1 represents a distance between the rotational center of the sun gear 282T and the outer peripheral surface 282R, and R2 represents a distance between the rotational center of the sun gear 282T and an end portion in a protruding direction of the protruded portion 282X.

In this manner, reducing the pivoting amount of the rotation switching member 83 can reduce impact of the second locking portion 83B hitting the protruded portion 282X, and can thereby reduce impact sound and also reduce abrasion loss of the leading end of the second locking portion 83B to increase durability.

The present disclosure is not limited to the exemplary embodiments described above, and it is needless to say that various modifications can be made without departing from the gist of the present disclosure.

Specifically, the two second locked portions are arranged in the first and second exemplary embodiments, but the present disclosure is not limited thereto. Arranging the second locked portions at an interval that is larger than that of the first locked portions can achieve effects similar to those in the case of arranging the two second locked portions.

While the solenoid 84 is used in the first and second exemplary embodiments described above, the present disclosure is not limited thereto, and a mechanical actuator or other types of actuators other than the solenoid 84 may be used.

The present disclosure can stabilize the switching operation of the rotational direction, and can prevent an increase in time required to switch the rotational direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-129318, filed Jul. 30, 2020, which is hereby incorporated by reference herein in its entirety.

What is claimed is:

1. A driving force transmitting apparatus comprising:
    a first planetary gear unit including a first locked gear provided with a plurality of first locked portions, and including a first mesh gear;
    a second planetary gear unit including a second locked gear provided with a plurality of second locked portions, and including a second mesh gear configured to mesh with the first mesh gear;
    a rotation switching member including a first locking portion and a second locking portion, wherein the rotation switching member is capable of moving to (i) a first stop position at which the first locking portion locks one of the plurality of first locked portions to stop the first locked gear, and (ii) a second stop position at which the second locking portion locks one of the plurality of second locked portions to stop the second locked gear; and
    an urging member configured to urge the rotation switching member to the second stop position,
    wherein an interval between the plurality of second locked portions in a rotational direction of the second locked gear is larger than an interval between the plurality of first locked portions in a rotational direction of the first locked gear.

2. The driving force transmitting apparatus according to claim 1,
    wherein the plurality of first locked portions is arranged at an equal interval in the rotational direction of the first locked gear, and
    wherein the plurality of second locked portions is arranged at an equal interval in the rotational direction of the second locked gear.

3. The driving force transmitting apparatus according to claim 1, wherein the plurality of second locked portions is arranged at an unequal interval in the rotational direction of the second locked gear.

4. The driving force transmitting apparatus according to claim 1, wherein a number of the plurality of first locked portions is larger than a number of the plurality of second locked portions.

5. The driving force transmitting apparatus according to claim 1, further comprising an actuator including the urging member and a solenoid main body,
    wherein the solenoid main body is configured to move the rotation switching member to the first stop position and the second stop position.

6. The driving force transmitting apparatus according to claim 5,
    wherein, in a case where the solenoid main body is in a non-energized state, the rotation switching member is moved to the second stop position by urging force of the urging member, and
    wherein, in a case where the solenoid main body is in an energized state, the rotation switching member is moved to the first stop position by magnetic force of the solenoid main body against the urging force of the urging member.

7. The driving force transmitting apparatus according to claim 5, wherein (i) force generated by the actuator and applied to the rotation switching member at a moment when the first locking portion locks one of the plurality of first locked portions is larger than (ii) force generated by the actuator and applied to the rotation switching member at a moment when the second locking portion locks one of the plurality of second locked portions.

8. The driving force transmitting apparatus according to claim 1,
    wherein the second locked gear includes a protruded portion that protrudes in a radial direction on an outer peripheral surface that comes in contact with the rotation switching member, and
    wherein each of the plurality of second locked portions is arranged at an end portion of the protruded portion in the rotational direction of the second locked gear.

9. The driving force transmitting apparatus according to claim 1, further comprising a driving force output gear,
    wherein the first planetary gear unit includes a first output gear configured to mesh with the driving force output gear, and
    wherein the second planetary gear unit includes a second output gear configured to mesh with the driving force output gear.

10. The driving force transmitting apparatus according to claim 9,
    wherein, in a case where the rotation switching member is at the first stop position, the second output gear is configured to rotate the driving force output gear in a first direction, and
    wherein, in a case where the rotation switching member is at the second stop position, the first output gear is configured to rotate the driving force output gear in a second direction opposite to the first direction.

11. The driving force transmitting apparatus according to claim 9, wherein the first planetary gear unit includes a first planetary gear that is supported by the first mesh gear and is configured to mesh with the first locked gear and the first output gear, and wherein the second planetary gear unit includes a second planetary gear that is supported by the second mesh gear and is configured to mesh with the second locked gear and the second output gear.

12. The driving force transmitting apparatus according to claim 11, wherein, in a case where the rotation switching member is at the first stop position, the second output gear is configured to rotate the driving force output gear in a first direction, and wherein, in a case where the rotation switching member is at the second stop position, the first output gear is configured to rotate the driving force output gear in a second direction opposite to the first direction.

13. The driving force transmitting apparatus according to claim 1, further comprising an input gear configured to mesh with the second mesh gear and transmit driving force to the second mesh gear.

14. A sheet conveyance apparatus comprising:
the driving force transmitting apparatus according to claim 1; and
a conveyance member configured to rotate forward or backward to convey a sheet in one direction or another direction,
wherein the conveyance member is configured to convey the sheet in the one direction or the other direction by being driven by driving force transmitted from a driving source via the driving force transmitting apparatus.

15. An image forming apparatus comprising:
the driving force transmitting apparatus according to claim 1;
a conveyance member configured to rotate forward or backward to convey a sheet in one direction or another direction; and
an image forming unit configured to form an image on the sheet conveyed by the conveyance member,
wherein the conveyance member is configured to convey the sheet in the one direction or the other direction by being driven by driving force transmitted from a driving source via the driving force transmitting apparatus.

16. The driving force transmitting apparatus according to claim 1, wherein the rotation switching member is capable of moving to the second stop position in a state where the second locked gear rotates.

17. The driving force transmitting apparatus according to claim 16, wherein the rotation switching member is capable of moving to the first stop position in a state where the first locked gear rotates.

18. The driving force transmitting apparatus according to claim 1, wherein the number of second locked portions of the plurality of second locked portions is two.

19. The driving force transmitting apparatus according to claim 1,
wherein the first locked gear is a first sun gear and the first mesh gear is a first carrier supporting a first planetary gear, and
wherein the second locked gear is a second sun gear and the second mesh gear is a second carrier supporting a second planetary gear.

20. The driving force transmitting apparatus according to claim 1, further comprising a driving force input gear and a driving force output gear,
wherein the first planetary gear unit includes a first output gear and the second planetary gear unit includes a second output gear, and
wherein the driving force input gear meshes with the second mesh gear, and the driving force output gear meshes with the first output gear and the second output gear.

* * * * *